United States Patent
Mori et al.

(10) Patent No.: US 11,415,903 B2
(45) Date of Patent: Aug. 16, 2022

(54) POLYESTER RESIN FOR TONERS, METHOD FOR PRODUCING SAME, TONER AND METHOD FOR PRODUCING TONER

(71) Applicant: Mitsubishi Chemical Corporation, Chiyoda-ku (JP)

(72) Inventors: Takahiro Mori, Tokyo (JP); Yoko Tamura, Tokyo (JP); Asako Kaneko, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 48 days.

(21) Appl. No.: 16/202,148

(22) Filed: Nov. 28, 2018

(65) Prior Publication Data

US 2019/0094733 A1 Mar. 28, 2019

Related U.S. Application Data

(63) Continuation of application No. PCT/JP2017/020660, filed on Jun. 2, 2017.

(30) Foreign Application Priority Data

Jun. 2, 2016 (JP) .............................. JP2016-111018
Nov. 15, 2016 (JP) .............................. JP2016-222003

(51) Int. Cl.
```
G03G 9/087      (2006.01)
C08G 63/668     (2006.01)
G03G 9/08       (2006.01)
C08G 63/672     (2006.01)
```

(52) U.S. Cl.
CPC ....... *G03G 9/08755* (2013.01); *C08G 63/668* (2013.01); *C08G 63/672* (2013.01); *G03G 9/081* (2013.01)

(58) Field of Classification Search
CPC .... C08G 63/668; C08G 63/672; G03G 9/081; G03G 9/08755
See application file for complete search history.

(56) References Cited

U.S. PATENT DOCUMENTS 5,294,682 A * 3/1994 Fukuda .............. G03G 9/09725
528/297
2005/0153230 A1* 7/2005 Koyanagi ............... C08L 67/07
430/270.1

(Continued)

FOREIGN PATENT DOCUMENTS

JP    50-135127    10/1975
JP    62-45622     2/1987

(Continued)

OTHER PUBLICATIONS

TH. Rieckmann et al "Poly(Ethylene Terephthalate) Catalysis, Kinetics, Mass Transfer and Reactor Design". (Year: 2003).*
Combined Office Action and Search Report dated Nov. 25, 2019 in Chinese Patent Application No. 201780012385.5 (with English Machine translation obtained by Global Dossier and English translation of categories of cited documents).
International Search Report dated Aug. 29, 2017 in PCT/JP2017/020660, filed on Jun. 2, 2017 (with English Translation).
Japanese Office Action dated Aug. 14, 2018 in Japanese Application 2017-535462 (with English Translation).

Primary Examiner — Frances Tischler
Assistant Examiner — Gennadiy Mesh
(74) Attorney, Agent, or Firm — Oblon, McClelland, Maier & Neustadt, L.L.P.

(57) ABSTRACT

A polyester resin, including:
(a) a constitutional unit derived from at least one tetravalent carboxylic acid selected from Compounds (A) and (B);
a constitutional unit derived from a bisphenol A-alkylene oxide adduct; and
a constitutional unit derived from an aliphatic alcohol having a boiling point of lower than or equal to 290° C.,
where the polyester resin is free of a constitutional unit derived from a monovalent carboxylic acid, an acid value of the polyester resin is 8 to 55 mg KOH/g, and an amount of the tetravalent carboxylic acid is 1 to 30 mol % when an total amount of the tetravalent carboxylic acid, and other polyvalent carboxylic acid excluding the Compounds (A) and (B) is set to 100 mol %,

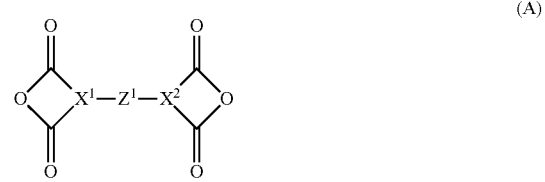

(A)

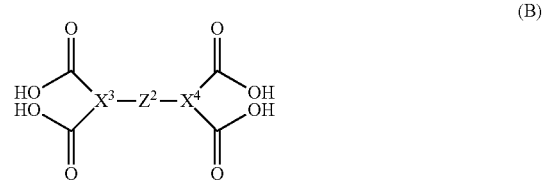

(B)

where $X^1$, $X^2$, $X^3$ and $X^4$ each independently represent a trivalent organic group, and $Z^1$ and $Z^2$ each independently represent a single bond or a divalent organic group, wherein tetravalent carboxylic acid is, for example, 3,3',4,4'-biphenyltetracarboxylic dianhydride, 2,2',6,6'-biphenyltetracarboxylic dianhydride, 4,4'-oxydiphthalic dianhydride, 9,9-bis(3,4-dicarboxyphenyl)fluorene dianhydride, and/or 4,4'-(4,4'-isopropylidenediphenoxy) diphthalic anhydride.

8 Claims, No Drawings

(56) References Cited

U.S. PATENT DOCUMENTS

| | | | | |
|---|---|---|---|---|
| 2010/0063204 A1* | 3/2010 | Hamasaki | ............ | G03G 9/08793 524/599 |
| 2011/0236817 A1* | 9/2011 | Takahashi | ............ | G03G 9/08782 430/108.24 |
| 2015/0080544 A1* | 3/2015 | Togawa | .............. | B29C 49/0005 528/285 |

FOREIGN PATENT DOCUMENTS

| | | | |
|---|---|---|---|
| JP | 10-60100 | | 3/1998 |
| JP | 10-123756 | | 5/1998 |
| JP | 11-106494 | | 4/1999 |
| JP | H11106494 | * | 4/1999 |
| JP | 2000-305315 | | 11/2000 |
| JP | 2005-194494 | | 7/2005 |
| JP | 2007-031509 | | 2/2007 |
| JP | 2007031509 | * | 2/2007 |
| JP | 2008-019368 | | 1/2008 |
| JP | 2008-040286 | | 2/2008 |
| JP | 2012-128127 | | 7/2012 |
| JP | 2015-111228 | | 6/2015 |

* cited by examiner

POLYESTER RESIN FOR TONERS, METHOD FOR PRODUCING SAME, TONER AND METHOD FOR PRODUCING TONER

This application is a continuation application of International Application No. PCT/JP2017/020660, filed on Jun. 2, 2017, which claims the benefit of priority of the prior Japanese Patent Application No. 2016-111018, filed on Jun. 2, 2016 and the prior Japanese Patent Application No. 2016-222003, filed on Nov. 15, 2016, the entire contents of which are incorporated herein by reference.

TECHNICAL FIELD

The present invention relates to polyester resin for toner, a method for producing the same, toner, and a method for producing the same.

BACKGROUND ART

In a method for obtaining an image through an electrophotographic printing method or an electrostatic charge development method, an electrostatic charge image formed on a photoreceptor is developed using toner which has been previously charged by friction, and is then fixed.

Regarding the fixing method, there is a heat roller method in which a toner image obtained through development is fixed using a pressurized and heated roller, and a non-contact fixing method in which fixing is performed using an electric oven or flash beam light.

In order to successfully pass through these processes, it is required that toner holds a stable charge amount or fixability to paper is favorable.

Furthermore, due to high-speed operation, miniaturization, and energy saving of printers in recent years, improvement in toner characteristics such as low-temperature fixability is also required for toner.

In order to obtain toner having excellent low-temperature fixability, it is effective to use a large amount of wax having a low melting point or resin having a low glass transition temperature (Tg).

However, when a large amount of wax having a low melting point or resin having a low Tg is used, elasticity of the toner at a high temperature decreases, and it is easily express an offset at a high temperature (that is, hot-offset resistance decreases). For this reason, polyester resin having high elasticity at a high temperature is used as binder resin for toner.

As a method for improving elasticity of resin at a high temperature, for example, a method for forming a crosslinked structure using a tri- or higher valent polyfunctional monomer in polyester resin is known.

For example, PTL 1 discloses polyester resin for toner having a high offset generation temperature using pyromellitic acid which is a polyvalent (tetravalent) carboxylic acid.

PTLs 2 and 3 disclose polyester resin for toner using various kinds of polyvalent (tetra- or higher valent) carboxylic acid.

In addition, when toner is heated during fixing or the like, in some cases, a volatile organic compound (VOC) may be generated.

There is a concern that the generation of VOC may affect the health of the user or the environment.

For this reason, in view of health and environmental protection, reduction of the total amount of VOC (Total Volatile Organic Compound: TVOC) is required in recent years, and the reduction of the TVOC (low TVOC) is required also for toner.

Examples of the method for reducing the TVOC of the binder resin which have been proposed include a method for distilling off a volatile component after polymerization in production of binder resin (PTL 4), a method for prolonging decompression reaction time during production of binder resin and removing residual monomers of the binder resin (PTL 5), and a method for adjusting the amount of a volatile component (aliphatic diol component) caused by polyester resin (PTL 6).

CITATION LIST

Patent Literature

[PTL 1] Japanese Unexamined Patent Application, First Publication No. S62-45622
[PTL 2] Japanese Unexamined Patent Application, First Publication No. H10-60100
[PTL 3] Japanese Unexamined Patent Application, First Publication No. 2015-111228
[PTL 4] Japanese Unexamined Patent Application, First Publication No. 2012-128127
[PTL 5] Japanese Unexamined Patent Application, First Publication No. 2008-40286
[PTL 6] Japanese Unexamined Patent Application, First Publication No. 2000-305315

SUMMARY OF INVENTION

Technical Problem

However, as disclosed in PTLs 1 to 3, in a case where a large amount of tri- or higher valent polyfunctional monomer is used, there is a concern that resin solidifies in a polymerization device due to a remarkably increased viscosity. Furthermore, even if resin having high elasticity is obtained, it is likely to be difficult to take out the resin from the polymerization device.

In addition, the methods disclosed in PTLs 4 and 5 are inferior in productivity.

As disclosed in Patent Document 6, there is a limit in reducing TVOC of polyester resin with the method for adjusting the amount of aliphatic diol component.

An object of the present invention is to provide polyester resin for toner which has excellent hot-offset resistance and can be easily taken out from a polymerization device, a method for producing the same, toner, and a method for producing the same.

Another object of the present invention is to provide polyester resin for toner which has sufficiently reduced TVOC and has high productivity, and in which safety is also taken into consideration, and toner containing the polyester resin for toner.

Solution to Problem

The present invention has the following embodiments.

[1] Polyester resin for toner including: a constitutional unit derived from at least one compound selected from the group consisting of Compounds (A) and (B); and a constitutional unit derived from tri- or higher valent carboxylic acid (excluding Compounds (A) and (B)), in which a content of the constitutional unit derived from tri- or higher valent carboxylic acid with respect to all constitutional units derived from carboxylic acid is greater than or equal to 0.5 mol %, and an acid value after melting and kneading is less than or equal to 55 mgKOH/g.

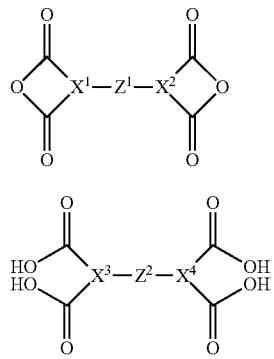

(in Formulae (A) and (B), $X^1$, $X^2$, $X^3$ and $X^4$ each independently represent a trivalent organic group, and $Z^1$ and $Z^2$ each independently represent a single bond or a divalent organic group)

[2] The polyester resin for toner according to [1], further including: a constitutional unit derived from aliphatic alcohol having a boiling point of lower than or equal to 290° C.; and a constitutional unit derived from a bisphenol A-alkylene oxide adduct, in which TVOC is less than or equal to 380 ppm.

[3] The polyester resin for toner according to [1] or [2], in which a storage elastic modulus G' at 180° C. after melting and kneading is greater than or equal to 300 Pa.

[4] The polyester resin for toner according to any one of [1] to [3], in which the storage elastic modulus G' at 240° C. is less than or equal to 1,000 Pa.

[5] A method for producing the polyester resin for toner according to any one of [1] to [4].

[4] Toner including: the polyester resin for toner according to any one of [1] to [4].

[5] A method for producing toner, including: a step of kneading the polyester resin for toner according to any one of [1] to [4].

Advantageous Effects of Invention

According to the present invention, it is possible to provide polyester resin for toner which has excellent hot-offset resistance and can be easily taken out from a polymerization device, a method for producing the same, toner, and a method for producing the same.

According to the present invention it is possible to provide polyester resin for toner which has sufficiently reduced TVOC, and toner containing the polyester resin for toner.

DESCRIPTION OF EMBODIMENTS

"Polyester Resin for Toner"

The polyester resin for toner of the present invention contains a constitutional unit derived from at least one compound (hereinafter, al so referred to as "tetravalent carboxylic acid (a)") selected from the group consisting of Compounds (A) and (B) shown below. The polyester resin for toner of the present invention preferably contains a unit derived from at least one compound selected from the group consisting of Compounds (1) to (4) shown below, as the constitutional unit.

<Tetravalent Carboxylic Acid (a)>

The polyester resin for toner of the present invention contains a constitutional unit derived from at least one compound (tetravalent carboxylic acid (a)) selected from the group consisting of Compounds (A) and (B).

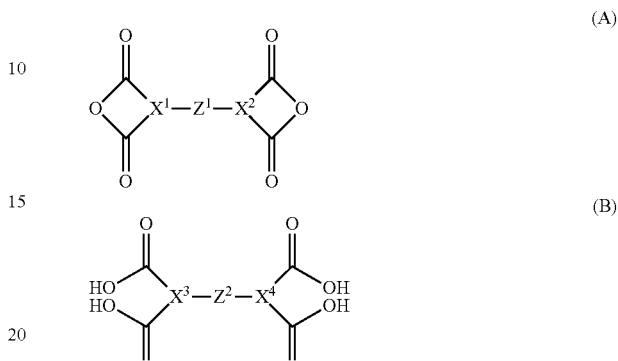

(in Formulae (A) and (B), $X^1$, $X^2$, $X^3$ and $X^4$ each independently represent a trivalent organic group, and $Z^1$ and $Z^2$ each independently represent a single bond or a divalent organic group)

Specific examples of $X^1$, $X^2$, $X^3$, and $X^4$ include a trivalent benzene ring, a trivalent fluorene ring, a trivalent naphthalene ring, and a trivalent cyclohexane ring.

The polyester resin for toner of the present invention preferably contains a unit derived from at least one compound selected from the group consisting of Compound (1) represented by Formula (1), Compound (2) represented by Formula (2), Compound (3) represented by Formula (3), and Compound (4) represented by Formula (4), as the constitutional unit.

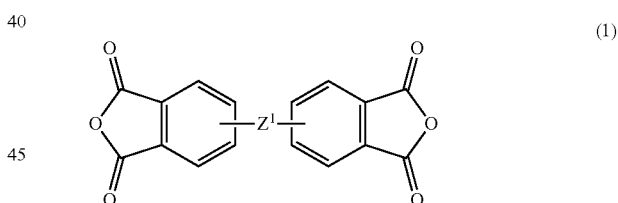

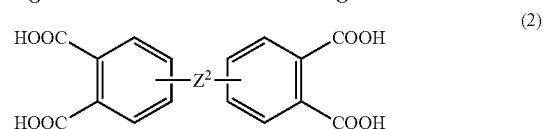

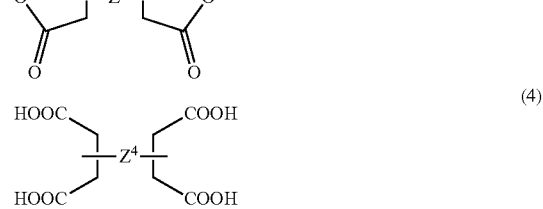

In Formula (1), $Z^1$ represents a single bond or a divalent linking group.

In Formula (2), $Z^2$ represents a single bond or a divalent linking group.

In Formula (3), $Z^3$ represents a single bond or a divalent linking group.

In Formula (4), $Z^4$ represents a single bond or a divalent linking group.

$Z^1$ to $Z^4$ each represents a single bond or a divalent linking group, and are chemical bonding groups having a molecular weight of less than 400.

Examples of the structure of the divalent linking group include an aliphatic chain having a methyl group or a trifluoromethyl group, an ether group, a carbonyl group, a sulfone group, and derivatives of bisphenol, fluorene, tetrahydronaphthalene, and cyclohexane.

Specific examples of the tetravalent carboxylic acid (a) include 1,1-bis(2,3-dicarboxyphenyl) ethane dianhydride, bis(2,3-dicarboxyphenyl) methane dianhydride, bis(3,4-dicarboxyphenyl) methane dianhydride, 3,3',4,4'-biphenyltetracarboxylic dianhydride, 2,2-bis(3,4-dicarboxyphenyl) propane dianhydride, 2,2-bis(2,3-dicarboxyphenyl) propane dianhydride, bis(3,4-dicarboxyphenyl) sulfone dianhydride, bis(3,4-dicarboxyphenyl) ether anhydride, bis(2,3-dicarboxyphenyl) ether dianhydride, 3,3',4,4'-benzophenone tetracarboxylic dianhydride, 2,2',3,3'-benzophenone tetracarboxylic dianhydride, 4,4'-oxydiphthalic dianhydride, 4,4-(p-phenylenedioxy) diphthalic dianhydride, 4,4 (m-phenylenedioxy) diphthalic dianhydride, 2,2',6,6'-biphenyltetracarboxylic dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 2,2'-bis(trifluoromethyl)-4,4',5,5'-biphenyltetracarboxylic dianhydride, 4,4'-(hexafluorotrimethylene)-diphthalic dianhydride, 4,4'-(octafluorotetramethylene)-diphthalic dianhydride, 4,4'-(4,4'-isopropylidenediphenoxy) diphthalic anhydride, 9,9-bis[4-(3,4-dicarboxyphenoxy)phenyl] fluorene dianhydride, 9,9-bis(3,4-dicarboxyphenyl) fluorene dianhydride, 5-(2,5-dioxotetrahydrofuryl)-3-methyl-3-cyclohexene-11,2-dicarboxylic anhydride, tricyclo[6.4.0.02,7] dodecane-1,8:2,7-tetracarboxylic dianhydride, bicyclo[2.2.2] oct-7-ene-2,3,5,6-tetracarboxylic dianhydride, 4-(2,5-dioxotetrahydrofuran-3-yl)-1,2,3,4-tetrahydronaphthalene-1,2-dicarboxylic anhydride, 1,1'-bicyclohexane-3,3',4,4'-tetracarboxylic dianhydride, and 1,2,3,4-butane tetracarboxylic dianhydride.

Among these, 3,3',4,4'-biphenyltetracarboxylic dianhydride is preferable from the viewpoints of cost, a balance of a storage elastic modulus of obtained polyester resin for toner, and excellent control of polymerization.

These may be used alone or in combination of two or more thereof.

The proportion of a constitutional unit derived from at least one compound selected from the group consisting of Compounds (A) and (B) with respect to 100 mol % of constitutional units derived from all carboxylic acid is preferably 0.1 to 10 mol %. Here, "100 mol % of constitutional units derived from all carboxylic acid" means that the total of a constitutional unit derived from tetravalent carboxylic acid (a), a constitutional unit derived from polyvalent carboxylic acid (b), and a constitutional unit derived from monovalent carboxylic acid is 100 mol %.

<Polyvalent Carboxylic Acid (b)>

Examples of the polyvalent carboxylic acid (b) (excluding Compounds (A) and (B)) include divalent carboxylic acid and trivalent carboxylic acid.

Tetravalent carboxylic acid other than Compound (A) and (B) (hereinafter, also referred to as the "other tetravalent carboxylic acid") may be used as the polyvalent carboxylic acid (b).

Examples of the divalent carboxylic acid include terephthalic acid, isophthalic acid, furandicarboxylic acid, or lower alkyl esters thereof, phthalic acid, sebacic acid, isodecyl succinic acid, dodecenyl succinic acid, maleic acid, fumaric acid, adipic acid, or monomethyl, monoethyl, dimethyl, and diethyl esters thereof, or acid anhydrides thereof. Examples of lower alkyl esters of terephthalic acid and isophthalic acid include dimethyl terephthalate, dimethyl isophthalate, diethyl terephthalate, diethyl isophthalate, dibutyl terephthalate, and dibutyl isophthalate. In addition, an aliphatic dicarboxylic acid component can also be appropriately used.

Among these, terephthalic acid and isophthalic acid are preferable from the viewpoints of workability and cost.

These may be used alone or in combination of two or more thereof.

Examples of the trivalent carboxylic acid include trimellitic acid, trimesic acid, 1,2,4-cyclohexane tricarboxylic acid, 2,5,7-naphthalene tricarboxylic acid, 1,2,4-naphthalene tricarboxylic acid, 1,2,5-hexane tricarboxylic acid, or acid anhydrides or lower alkyl esters thereof.

Among these, trimellitic acid or acid anhydride thereof is preferable from the viewpoints of workability and cost.

These may be used alone or in combination of two or more thereof.

Examples of the other tetravalent carboxylic acid include pyromellitic acid, benzene-1,2,3,4-tetracarboxylic acid, 1,4,5,8-naphthalene tricarboxylic acid, methylcyclohexane tetracarboxylic acid, or acid anhydrides or lower alkyl esters thereof.

These may be used alone or in combination of two or more thereof.

Examples of the tri- or higher valent carboxylic acid include trimellitic acid, trimesic acid, 1,2,4-cyclohexane tricarboxylic acid, 2,5,7-naphthalene tricarboxylic acid, 1,2,4-naphthalene tricarboxylic acid, 1,2,5-hexane tricarboxylic acid, pyromellitic acid, benzene-1,2,3,4-tetracarboxylic acid, 1,4,5,8-naphthalene tetracarboxylic acid, methylcyclohexane tetracarboxylic acid, or acid anhydrides or lower alkyl esters thereof.

These may be used alone or in combination of two or more thereof.

The content of a constitutional unit derived from tri- or higher valent carboxylic acid with respect to all constitutional units derived from carboxylic acid is greater than or equal to 0.5 mol %, preferably less than or equal to 30 mol %, and more preferably less than or equal to 20 mol %. Specifically, 0.5 to 30 mol % is preferable and 0.5 to 20 mol % is more preferable.

<Polyhydric Alcohol (c)>

Examples of the polyhydric alcohol (c) include dihydric alcohol and tri- or higher valent alcohol.

Examples of the dihydric alcohol include ethylene glycol, neopentyl glycol, 1,2-propylene glycol, butanediol, polyethylene glycol, diethylene glycol, triethylene glycol, 1,4-cyclohexane dimethanol, and a bisphenol A-alkylene oxide adduct.

Specific examples of the bisphenol A-alkylene oxide adduct include polyoxyethylene-(2.0)-2,2-bis(4-hydroxyphenyl) propane, polyoxypropylene-(2.0)-2,2-bis(4-hydroxyphenyl) propane, polyoxypropylene-(2.3)-2,2-bis(4-hydroxyphenyl) propane, polyoxypropylene (2.2)-polyoxyethylene-(2.0)-2,2-bis(4-hydroxyphenyl) propane, polyoxypropylene (6)-2,2-bis(4-hydroxyphenyl) propane, polyoxypropylene (2.2)-2,2-bis(4-hydroxyphenyl) propane, polyoxypropylene-(2.4)-2,2-bis(4-hydroxyphenyl) propane, and polyoxypropylene (3.3)-2,2-bis(4-hydroxyphenyl) propane. The numerical values in parentheses represent an addition molar number of alkylene oxide.

Among these, a bisphenol A-alkylene oxide adduct is preferable from the viewpoint of improving preservability of toner. Among these, polyoxypropylene-(2.3)-2,2-bis(4-hydroxyphenyl) propane is preferable from the viewpoint of reducing the viscosity of slurry at normal temperature. From the viewpoints of polymerization reactivity or ease of designing glass transition temperature (Tg) of resin to be higher than or equal to 40° C., ethylene glycol, 1,2-propylene glycol, and 1,4-cyclohexane dimethanol are preferable, and ethylene glycol and 1,2-propylene glycol are particularly preferable.

These may be used alone or in combination of two or more thereof.

Aliphatic alcohol which is dihydric polyalcohol contains components having a boiling point of lower than or equal to 290° C., and therefore, corresponds to VOC.

For this reason, when aliphatic alcohol is used as the polyhydric polyalcohol, polyester resin has excellent productivity. However, polyester resin having high TVOC is easily obtained.

However, although the reason is not clarified, in the present invention, polyester resin having low TVOC is easily obtained using tetravalent carboxylic acid (a) having an acid anhydride structure which has favorable reactivity with alcohol.

Examples of the aliphatic alcohol having a boiling point of lower than or equal to 290° C. include ethylene glycol, neopentyl glycol, 1,2-propylene glycol, butanediol, diethylene glycol, and triethylene glycol.

Examples of the tri- or higher hydric alcohol include sorbitol, 1,2,3,6-hexatetralol, 1,4-sorbitan, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene.

Among these, trimethylolpropane is preferable from the viewpoints of workability and cost.

These may be used alone or in combination of two or more thereof.

<Others>

Raw materials (other raw materials) other than the tetravalent carboxylic acid (a), the polyvalent carboxylic acid (b), and the polyhydric alcohol (c) described above may be used as raw materials of the polyester resin for toner within the scope not impairing the effect of the present invention for the purpose of adjusting the number of terminal functional groups or improving dispersibility of other materials for toner.

Examples of the other raw materials include monovalent carboxylic acid and monohydric alcohol.

Examples of the monovalent carboxylic acid include aromatic carboxylic acids such as benzoic acid and p-methylbenzoic acid which have 30 or less carbon atoms; aliphatic carboxylic acids such as stearic acid and behenic acid which have 30 or less carbon atoms; and unsaturated carboxylic acids such as cinnamic acid, oleic acid, linoleic acid, and linolenic acid which have one or more unsaturated double bonds in a molecule.

Examples of the monohydric alcohol include aromatic alcohol such as benzyl alcohol which has 30 or less carbon atoms; and aliphatic alcohols such as oleyl alcohol, lauryl alcohol, cetyl alcohol, stearyl alcohol, and behenyl alcohol which have 30 or less carbon atoms.

<Physical Properties of Polyester Resin for Toner>

The storage elastic modulus (G') of the polyester resin for toner of the present invention at 180° C. after kneading under the following kneading conditions is preferably greater than or equal to 300 Pa and more preferably greater than or equal to 600 Pa. Although the details will be described below, since toner is produced by, for example, mixing polyester resin for toner with a formulation (for example, a colorant), and then, melting and kneading the mixture, the polyester resin for toner kneaded under the following kneading conditions is almost in the same state as a case where the kneaded polyester resin for toner becomes toner. Accordingly, when the storage elastic modulus (G') at 180° C. after kneading is greater than or equal to 300 Pa, hot-offset resistance is improved when the polyester resin for toner is used for toner. The upper limit value of the storage elastic modulus (G') at 180° C. after kneading is not particularly limited. However, the upper limit value thereof is preferably as high as possible, and is practically less than or equal to 2,000 Pa. Specifically, 300 to 2,000 Pa is preferable and 600 to 2,000 Pa is more preferable.

The storage elastic modulus can be measured through a rotary type rheometer method.

(Kneading Conditions)

Polyester resin is melted and kneaded using a twin-screw extruder under the conditions of a set temperature of 120° C. and a staying time of 3 minutes.

The TVOC of the polyester resin is less than or equal to 380 ppm, preferably less than or equal to 330 ppm, and more preferably less than or equal to 300 ppm.

Binder resin such as polyester resin is usually contained in toner in an amount of about less than or equal to 90 mass %.

When the TVOC of the polyester resin is less than or equal to 380 ppm, the TVOC of toner containing the polyester resin is substantially less than or equal to 300 ppm. Therefore, toner with sufficiently reduced TVOC is obtained.

The TVOC of the polyester resin can be measured using a gas chromatograph-mass spectrometer (GC-MS).

In addition, the storage elastic modulus (G') of the polyester resin for toner of the present invention at 240° C. is preferably less than or equal to 1,000 Pa, more preferably less than 600 Pa, and still more preferably less than 400 Pa. When the storage elastic modulus (G') at 240° C. is less than or equal to 1,000 Pa, the polyester resin for toner has excellent removability from a polymerization device. The lower limit value of the storage elastic modulus (G') at 240° C. is not particularly limited. However, the upper limit value thereof is preferably as low as possible, and is practically greater than or equal to 50 Pa. Specifically, 50 to 1,000 Pa is preferable, greater than or equal to 50 and less than 600 Pa is more preferable, and greater than or equal to 50 and less than 400 Pa is still more preferable.

The glass transition temperature (Tg) of the polyester resin for toner is preferably higher than or equal to 40° C. and lower than 75° C. The glass transition temperature thereof is preferably higher than or equal to 45° C. from the viewpoint of preservability of toner and is lower than or equal to 73° C. from the viewpoint of low-temperature fixability. The glass transition temperature thereof is particularly preferably 48° C. to 68° C.

The Tg of the polyester resin for toner is obtained through measurement using a differential scanning calorimeter.

Specifically, after melt-quenching is performed through heating at 100° C. for 10 minutes, the temperature of an intersection of a base line on the low temperature when measured at a heating rate of 5° C./min and a tangent of an endothermic curve in the vicinity of Tg is obtained, and the obtained temperature is set as Tg.

The softening temperature (T4) of the polyester resin for toner is preferably from 90° C. to 180° C. When the T4 of the polyester resin for toner is higher than or equal to 90° C., durability as binder resin can be favorably maintained. When the T4 is lower than or equal to 180° C., low-temperature fluidity can be favorably maintained.

T4 of the polyester resin for toner is measured with a 1 mm$\phi$×10 mm nozzle under the conditions of a load of 294 N (30 Kgf) and a constant temperature rise at a heating rate of 3° C./min and is a temperature when 4 mm out of 1.0 g of a sample is flowed out.

The acid value after melting and kneading the polyester resin for toner is less than or equal to 55 mgKOH/g, preferably 2 to 25 mgKOH/g, and more preferably 3 to 20 mgKOH/g. When the acid value of the polyester resin for toner is less than or equal to 55 mgKOH/g, the polyester resin for toner has excellent hot-offset resistance. In addition, when the acid value is greater than or equal to 2 mgKOH/g, the reactivity of the polyester resin for toner tends to improve. When the acid value is less than or equal to 25 mgKOH/g, the image density of toner tends to be more stable.

The method for measuring an acid value after melting and kneading is as follows.

<Method for Measuring Acid Value>

The acid value of resin after melting and kneading is obtained as follows.

Polyester resin is melted and kneaded using a twin-screw extruder under the conditions of a set temperature of 120° C. and a staying time of 3 minutes.

Approximately 0.2 g of a measurement sample is weighed (A (g)) into a branched Erlenmeyer flask, 10 ml of benzyl alcohol is added thereto, and the mixture is heated for 15 minutes using a heater at 230° C. in a nitrogen atmosphere to dissolve the measurement sample. After allowing the mixture to cool to room temperature, 10 ml of benzyl alcohol, 20 ml of chloroform, and several droplets of a phenolphthalein solution are added thereto, and titrated with a 0.02 N KOH solution (titration amount=B (ml), potency of KOH solution=p). Blank measurement is similarly carried out (titration amount=C (ml)), and the acid value is calculated according to the following equation.

$$\text{Acid value (mgKOH/g)} = \{(B-C) \times 0.02 \times 56.11 \times p\}/A$$

The gel content of the polyester resin for toner is preferably greater than or equal to 10 mass % with respect to the total mass of the polyester resin for toner. When the gel content is greater than or equal to 10 mass %, the hot-offset resistance of toner tends to become favorable. In addition, the gel content of the polyester resin for toner is preferably less than or equal to 50 mass % with respect to the total mass of the polyester resin for toner. When the gel content is less than or equal to 50 mass %, the polyester resin for toner is more easily taken out from a polymerization device, that is, tends to be superior in removability. Specifically, the gel content is preferably from 10 to 50 mass %.

The gel content of the polyester resin for toner is obtained as follows.

First, approximately 0.5 g of polyester resin for toner is weighed (D (g)) into a 100 mL Erlenmeyer flask, and 50 mL of tetrahydrofuran (THF) is added thereto to dissolve the polyester resin for toner.

A glass filter is separately filled with celite 545 tightly for 60 to 70% and sufficiently dried. Then, the dried glass filter is weighed (E (g)).

Subsequently, a THF solution in which the polyester resin for toner is dissolved is transferred into the dried glass filter to perform suction filtration. All contents remaining on the wall of the Erlenmeyer flask is transferred into the glass filter using acetone, soluble contents in the glass filter are dropped into a suction bottle while pouring acetone in the glass filter which is then continuously sucked so that no solvent remains in the filter. Thereafter, the glass filter is sufficiently dried with a vacuum dryer, the dried glass filter is weighted (F (g)), and the gel content (THF-insoluble contents) is calculated according to the following equation.

$$\text{Gel content (mass \%)} = (F-E)/D \times 100$$

The number average molecular weight (Mn) of polyester resin for toner is preferably 1,000 to 300,000, more preferably 1,000 to 30,000, and still more preferably 1,000 to 10,000.

When the Mn of the polyester resin for toner is within the above-described ranges, durability and fixability of toner are further improved.

The Mn of the polyester resin can be measured through a gel permeation chromatography (GPC). For example, the Mn of the polyester resin can be determined as a polystyrene-converted molecular weight using a solvent such as tetrahydrofuran as an eluent.

The polyester resin for toner is preferably amorphous in consideration of the performance as binder resin.

In order to make the polyester resin for toner amorphous, the types or the proportion of raw material components may be adjusted. Specifically, by increasing the amount of polyvalent (tri- or higher valent) carboxylic acid or polyhydric alcohol, amorphous polyester resin for toner is easily obtained.

It is preferable that the polyester resin for toner contains a constitutional unit derived from at least one compound selected from the group consisting of 3,3',4,4'-biphenyltetracarboxylic dianhydride, 2,2',6,6'-biphenyltetracarboxylic dianhydride, 4,4'-oxydiphthalic dianhydride, 9,9-bis(3,4-dicarboxyphenyl) fluorene dianhydride, and 4,4'-(4,4'-isopropylidenediphenoxy) diphthalic anhydride and a constitutional unit derived from at least one compound selected from the group consisting of pyromellitic dianhydride and trimellitic anhydride.

It is preferable that the polyester resin for toner contains a constitutional unit derived from at least one compound selected from the group consisting of 3,3',4,4'-biphenyltetracarboxylic dianhydride, 2,2',6,6'-biphenyltetracarboxylic dianhydride, 4,4'-oxydiphthalic dianhydride, 9,9-bis(3,4-dicarboxyphenyl) fluorene dianhydride, and 4,4'-(4,4'-isopropylidenediphenoxy) diphthalic anhydride, a constitutional unit derived from at least one compound selected from the group consisting of pyromellitic dianhydride and trimellitic anhydride, and a constitutional unit derived from at least one compound selected from the group consisting of ethylene glycol, 2.3 mol of a bisphenol A-propylene oxide adduct, 2.0 mol of a bisphenol A-ethylene oxide adduct, and 2.3 mol of a bisphenol A-ethylene oxide adduct.

<Production of Polyester Resin for Toner>

The polyester resin for toner of the present invention is obtained by reacting polyvalent carboxylic acid (b), polyhydric alcohol (c), and other materials as necessary in the presence of at least one compound (tetravalent carboxylic acid (a)) selected from the group consisting of Compounds (A) and (B) described above.

The amount of the tetravalent carboxylic acid (a) is preferably 1 to 30 mol % and more preferably 2 to 25 mol % when the total amount of the tetravalent carboxylic acid (a) and the polyvalent carboxylic acid (b) is set to 100 mol %. When the amount of the tetravalent carboxylic acid (a) is greater than or equal to 1 mol %, it is easy to obtain polyester resin for toner having a sufficiently crosslinked structure, and the hot-offset resistance of toner is further improved. On the other hand, when the amount of the tetravalent carboxylic acid (a) is less than or equal to 30 mol %, it is possible to suppress increase in viscosity during the reaction and favorably maintain the polymerization stability.

In addition, the amount of the polyhydric alcohol (c) is preferably 80 to 250 parts by mole and more preferably 105 to 180 parts by mole when the total amount of the tetravalent carboxylic acid (a) and the polyvalent carboxylic acid (b) is set to 100 parts by mole. When the amount of the polyhydric alcohol (c) is within the above-described ranges, the balance between Tg, T4, and an acid value of the polyester resin for toner becomes favorable.

In particular, in a case where a bisphenol A-alkylene oxide adduct is used as the polyhydric alcohol (c), the amount of the bisphenol A-alkylene oxide adduct is preferably 5 to 140 parts by mole and more preferably 10 to 120 part by mole with respect to 100 part by mole of the total amount of the tetravalent carboxylic acid (a) and the polyvalent carboxylic acid (b). When the amount of the bisphenol A-alkylene oxide adduct is greater than or equal to 5 parts by mole, the preservability of toner is improved. When the amount of the bisphenol A-alkylene oxide adduct is less than or equal to 140 parts by mole, the polymerization stability can be favorably maintained.

The polyester resin can be obtained through a well-known polymerization method. However, the polyester resin is obtained through an esterification reaction or an ester exchange reaction, and a condensation reaction.

In general, the esterification reaction and the ester exchange reaction are carried out until no distillate of water is left from the reaction system. Thereafter, a polycondensation reaction is subsequently carried out. At this time, the polycondensation reaction is carried out while gradually decompressing the inside of a reaction device and distilling off and removing diol components under vacuum of lower than or equal to 150 mmHg (20 kPa), preferably lower than or equal to 15 mmHg (2 kPa). On the other hand, the condensation reaction is carried out until the torque of a stirring blade reaches a value showing a desired softening temperature.

The termination of a reaction means that stirring of a polymerization device is stopped and the inside of the polymerization device is brought to atmospheric pressure. Thereafter, the inside of the polymerization device is pressurized with inert gas such as nitrogen, and a reactant (polyester resin for toner) is taken out from the lower portion of the polymerization device and cooled down to a temperature lower than or equal to 100° C.

The polymerization temperature is preferably within a range of 180° C. to 280° C. When the polymerization temperature is higher than or equal to 180° C., the productivity tends to become favorable. When the polymerization temperature is lower than or equal to 280° C., there is a tendency that it is possible to suppress decomposition of polyester resin or by-production of a volatile component which causes odor. The lower limit value of the polymerization temperature is more preferably higher than or equal to 200° C., and the upper limit value is more preferably lower than or equal to 270° C.

A polymerization catalyst may be used during the esterification reaction, the ester exchange reaction, and the condensation reaction.

Examples of the polymerization catalyst include titanium alkoxide compounds (for example, tetramethoxy titanium, tetraethoxy titanium, tetrapropoxy titanium, and tetra-n-butoxy titanium), titanium oxide, dibutyltin oxide, tin acetate, zinc acetate, tin disulfide, antimony trioxide, germanium dioxide, magnesium acetate, and calcium acetate.

In addition, the reaction may be carried out in the presence of a releasing agent within the scope not impairing the effect of the present invention. By performing the reaction in the presence of a releasing agent, fixing property of toner and dispersibility of wax tend to be improved.

Examples of the releasing agent include the same ones as waxes which can be used as a toner formulation and are to be described below, and can be used alone or in combination of two or more kinds.

Furthermore, the reaction may be carried out in the presence of a stabilizer for the purpose of enhancing the polymerization stability of the polyester resin for toner.

Examples of the stabilizer include hydroquinone, methylhydroquinone, and hindered phenol compounds.

<Action and Effect>

The polyester resin for toner of the present invention as described above contains a unit derived from the above-described tetravalent carboxylic acid (a) as a constitutional unit, and therefore, has excellent hot-offset resistance and is easily taken out from a polymerization device. Specifically, since the storage elastic modulus (G') of the polyester resin for toner of the present invention at 180° C. after kneading under the above-described kneading conditions tends to become greater than or equal to 300 Pa, and therefore, the polyester resin for toner has excellent hot-offset resistance. In addition, since the storage elastic modulus (G') at 240° C. of the polyester resin for toner of the present invention tends to be less than 600 Pa, the polyester resin for toner can be easily taken out from a polymerization device.

In addition, according to the method for producing polyester resin for toner of the present invention, polyester resin for toner of which the storage elastic modulus (G') at 240° C. is less than 600 Pa and the storage elastic modulus (G') at 180° C. after kneading under the above-described kneading conditions is greater than or equal to 300 Pa is easily obtained.

The polyester resin of the present invention is produced using tetravalent carboxylic acid (a) so that TVOC is less than or equal to 380 ppm.

Accordingly, the TVOC of the polyester resin of the present invention sufficiently decreases.

Moreover, in the case of the polyester resin of the present invention, it is unnecessary to distill off volatile components after polymerization in production of resin unlike in the related art, or to prolong decompression reaction time during the production of resin to remove residual monomers. In addition, since ethylene glycol having high reactivity is used, the polyester resin has high productivity.

The polyester resin of the present invention is suitable as binder resin for toner, and therefore, it is possible to obtain toner with sufficiently reduced TVOC using the polyester resin of the present invention.

"Toner"

The toner of the present invention contains the above-described polyester resin for toner of the present invention.

The content of the polyester resin for toner of the present invention is preferably 5 to 95 mass % with respect to the total mass of toner.

The toner of the present invention may contain a formulation of a colorant, a charge control agent, a releasing agent, a flow modifier, a magnetic material, and resin other than the polyester resin for toner of the present invention (other kinds of binder resin) as necessary.

Examples of the colorant include carbon black, nigrosine, aniline blue, phthalocyanine blue, phthalocyanine green, Hansa yellow, rhodamine dyes and pigments, chrome yellow, quinacridone, benzidine yellow, rose bengal, triallyl methane dyes, and monoazo type, disazo type, and condensed azo type dyes or pigments. The dyes or pigments may be used alone or in combination of two or more thereof.

In a case where toner is used as color toner, examples of a yellow colorant include benzidine yellow, monoazo dyes and pigments, and condensed azo dyes and pigments, and examples of a magenta colorant include quinacridone, rhodamine dyes and pigments, and monoazo dyes and pigments, and an example of a cyan colorant includes phthalocyanine blue.

The content of the colorant is not particularly limited, but is preferably 2 to 10 mass % with respect to the total mass of toner, from the viewpoints of excellent color tone, image density, and heat characteristics of toner.

Examples of the charge control agent include positive charge type charge control agents such as quaternary ammonium salt or a basic or electron-donating organic substance; negative charge type charge control agents such as metal chelate, metal-containing dyes, and acidic or electron-withdrawing organic substances.

In a case of using toner as color toner, a charge control agent which is colorless or light color and has little color tone hindrance to toner is suitable. Examples of such a charge control agent include chromium salicylate or chromium alkyl salicylate, zinc, metal salts with aluminum and the like, metal complexes, amide compounds, phenol compounds, and naphthol compounds. Furthermore, a vinyl polymer having a styrene group, an acrylic acid group, a methacrylic acid group, or a sulfonic acid group may be used as a charge control agent.

The content of the charge control agent is preferably 0.5 to 5 mass % with respect to the total mass of toner. When the content of the charge control agent is greater than or equal to 0.5 mass %, the charge amount of toner tends to be a sufficient level. When the content of the charge control agent is less than or equal to 5 mass %, the decrease in the charge amount due to aggregation of the charge control agent tends to be suppressed.

In consideration of releasability, preservability, fixing property, color developability, and the like of toner, carnauba wax, rice wax, beeswax, polypropylene wax, polyethylene wax, synthetic ester wax, paraffin wax, fatty acid amide, silicone wax, and the like can be appropriately selected and used as a releasing agent. These may be used alone or in combination of two or more thereof.

The melting point of the releasing agent may be appropriately determined in consideration of the above-described toner performance.

The content of the releasing agent is not particularly limited, but is preferably 0.3 to 15 mass % with respect to the total mass of toner from the viewpoint of affecting the above-described toner performance. The lower limit value of the content of the releasing agent is preferably greater than or equal to 1 mass % and particularly preferably greater than or equal to 2 mass %. In addition, the upper limit value of the content of the releasing agent is more preferably less than or equal to 13 mass % and particularly preferably less than or equal to 12 mass %.

Examples of additives such as flow modifiers include fine powder fluidity improvers such as silica, alumina, and titania; inorganic fine powders such as magnetite, ferrite, cerium oxide, strontium titanate, and conductive titania; resistance regulators such as styrene resin and acrylic resin; and lubricants. These additives are used as internal additives or external additives.

The content of the additives is preferably 0.05 to 10 mass % with respect to the total mass of toner. When the content of the additives is greater than or equal to 0.05 mass %, there is a tendency that the effect of improving the performance of toner is sufficiently obtained. When the content of the additives is less than or equal to 10 mass %, there is a tendency that the image stability of toner becomes favorable.

Examples of the other kinds of binder resin include polyester resin (excluding the polyester resin for toner of the present invention), styrene resin, styrene-acrylic resin, cyclic olefin resin, methacrylic acid resin, and epoxy resin. These may be used alone or in combination of two or more thereof.

The toner of the present invention can be used as any one of a magnetic one-component developer, a nonmagnetic one-component developer, and a two-component developer.

When the toner of the present invention is used as a magnetic one-component developer, the toner contains a magnetic material. Examples of the magnetic material include ferromagnetic alloy including, for example, ferrite, magnetite, iron, cobalt, and nickel; and alloy (for example, Hensler alloy, such as manganese-copper-aluminum and manganese-copper-tin, which contains manganese and copper, and chromium dioxide) which do not contain compounds or ferromagnetic elements but exhibits ferromagnetism through suitable heat treatment.

The content of the magnetic material is not particularly limited, but is preferably 3 to 70 mass % with respect to the total mass of toner, from the viewpoint of greatly affecting pulverizability of toner. When the content of the magnetic material is greater than or equal to 3 mass %, there is a tendency that the charge amount of toner becomes a sufficient level. When the content the content of the magnetic material is less than or equal to 70 mass %, there is a tendency that the fixing property or the pulverizability of toner becomes favorable. The upper limit value of the content of the magnetic material is more preferably less than or equal to 60 mass % and particularly preferably less than or equal to 50 mass %.

When the toner of the present invention is used as a two-component developer, the toner of the present invention is used in combination with a carrier.

Examples of the carrier include magnetic substances such as iron powder, magnetite powder, and ferrite powder, those kinds of powder of which the surfaces are coated with resin, and magnetic carriers. Examples of the coating resin for the resin-coated carriers include styrene resin, acrylic resin, styrene-acryl copolymeric resin, silicone resin, modified silicone resin, fluorine resin, and a mixture of these kinds of resin.

The amount of carrier used is preferably 500 to 1,000 parts by mass with respect to 100 parts by mass of toner. When the amount of carrier used is greater than or equal to 500 parts by mass, fogging or the like tends to hardly occur. When the amount of carrier used is less than or equal to 1,000 parts by mass, the density of a fixed image tends to be sufficiently high.

<Method for Producing Toner>

The method for producing toner of the present invention is not particularly limited, and any of a pulverization method and a chemical method can be employed. The polyester resin for toner of the present invention is particularly suitable for a pulverization method including a step of kneading polyester resin for toner.

In the pulverization method, toner is produced as follows. For example, the polyester resin for toner of the present invention is mixed with the above-described formulation. Thereafter, the mixture is melted and kneaded using a twin-screw extruder or the like, and coarse pulverization, fine pulverization, and classification are performed. A treatment of externally adding inorganic particles thereto is performed as necessary.

In the chemical method, toner is produced as follows. For example, a liquid obtained by dissolving and dispersing the polyester resin for toner of the present invention and a formulation in a solvent is dispersed in an aqueous medium in which a dispersion stabilizer is dissolved or dispersed for granulation. Thereafter, the solvent is removed, and the granulated matters are washed and dried to obtain toner particles. A treatment of externally adding inorganic particles thereto is performed as necessary. In addition, toner can also be produced as follows. For example, a solution obtained by dissolving polyester resin for toner of the present invention in a solvent is emulsified in an aqueous medium in which a dispersion stabilizer is dissolved or dispersed. Thereafter, the solvent is removed, the obtained polyester emulsion is mixed with an aqueous medium in which a formulation is dispersed, and fine particles are aggregated and fused. Then, the aggregates are separated therefrom, washed, and dried to obtain toner particles. A treatment of externally adding inorganic particles thereto is performed as necessary.

The average particle diameter of the toner of the present invention is not particularly limited, but is preferably 3 to 15 μm and more preferably 5 to 10 μm. When the average particle diameter of the toner is greater than or equal to 3 μm, the productivity tends to become favorable, and the problem of pneumoconiosis also tends to hardly occur. On the other hand, when the average particle diameter of the toner is less than or equal to 15 μm, there is a tendency that a high-quality image can be stably formed. The average particle diameter can be measured with a particle size distribution measuring device.

The toner of the present invention contains the above-described polyester resin for toner of the present invention, and therefore, has excellent hot-offset resistance.

EXAMPLES

Hereinafter, the present invention will be described in more detail using examples, but is not limited to these examples.

"Measurement and Evaluation Methods"

<Composition Analysis of Constitutional Unit>

The constitutional unit (composition) of polyester resin was analyzed as follows.

1H-NMR and 13C-NMR were measured using a superconducting nuclear magnetic resonance apparatus under the following conditions, and the proportion of tetravalent carboxylic acid (a), polyvalent carboxylic acid (b), and polyhydric alcohol (c) was obtained from an integral proportion of attribution peaks derived from constitutional units.

Apparatus: "ECS-400" manufactured by JEOL Ltd.
Magnet: JMTC-400/54/SS
Observation frequency: 1H-NMR (400 MHz), 13C-NMR (100 MHz)
Solvent: Deuterated chloroform
Temperature: 50° C.
Number of times of integration: 1H-NMR (256 times), 13C-NMR (5,000 times)

<Measurement of Glass Transition Temperature (Tg)>

The glass transition temperature of the polyester resin was measured from an intersection of a baseline of a chart at a heating rate of 5° C./min and a tangent of an endothermic curve, using a differential scanning calorimeter ("DSC-60" manufactured by Shimadzu Corporation). A sample which is obtained by weighing 10 mg±0.5 mg of a measurement sample into an aluminum pan, melting the weighed measurement sample at 100° C. which is higher than or equal to the glass transition temperature for 10 minutes, and then, subjecting the melted measurement sample to a rapid cooling treatment using dry ice.

<Measurement of Softening Temperature (T4)>

Regarding the softening temperature of polyester resin, the temperature when 4 mm out of 1.0 g of a resin sample was flowed out was measured using a flow tester ("CFT-500D" manufactured by Shimadzu Corporation) under a load of 294 N and a constant temperature rise at a heating rate of 3° C./min with a 1 mmφ×10 mm nozzle, and the measured temperature was set as a softening temperature.

<Measurement of Acid Value>

The acid value of polyester resin after melting and kneading is measured as follows.

Polyester resin was melted and kneaded using a twin-screw extruder under the conditions of a set temperature of 120° C. and a staying time of 3 minutes.

Approximately 0.2 g of a measurement sample was weighed (A (g)) into a branched Erlenmeyer flask, 10 ml of benzyl alcohol was added thereto, and the mixture was heated for 15 minutes using a heater at 230° C. in a nitrogen atmosphere to dissolve the measurement sample. After allowing the mixture to cool to room temperature, 10 ml of benzyl alcohol, 20 ml of chloroform, and several droplets of a phenolphthalein solution were added thereto, and titrated with a 0.02 N KOH solution (titration amount=B (ml), potency of KOH solution=p). Blank measurement was similarly carried out (titration amount=C (ml)), and the acid value was calculated according to the following equation.

$$\text{Acid value (mgKOH/g)}=\{(B-C)\times 0.02\times 56.11\times p\}/A$$

<Measurement of Number Average Molecular Weight (Mn)>

The number average molecular weight of polyester resin was measured as follows.

An elution curve of a measurement sample dissolved in tetrahydrofuran (THF) was measured through gel permeation chromatography (GPC) and the number average molecular weight of the measurement sample was calculated based on a calibration curve using standard polystyrene.

<Measurement of Gel Content (THF-Insoluble Contents)>

The gel content of polyester resin was measured as follows.

Approximately 0.5 g of a measurement sample was weighed (D (g)) into a 100 mL Erlenmeyer flask, 50 mL of THF was added thereto, and the mixture was immersed in a water bath, set at 70° C., for 3 hours to dissolve the measurement sample in THF.

A glass filter 1GP100 was separately filled with celite 545 tightly for 6 to 7 minutes and dried for 3 hours or longer using a drier at 105° C. Then, the dried glass filter was weighed (E (g)).

Subsequently, a THF solution in which the measurement sample was dissolved was transferred into the dried glass filter to perform suction filtration. All contents remaining on the wall of the Erlenmeyer flask was transferred into the glass filter using acetone, soluble contents in the glass filter were dropped into a suction bottle while pouring acetone in the glass filter which was then continuously sucked so that no solvent remains in the filter. Thereafter, the glass filter was dried with a vacuum dryer at 80° C. for 1 hour or longer, the dried glass filter was weighted (F (g)), and the gel content (THF-insoluble content) was calculated according to the following equation.

Gel content (mass %)=$(F-E)/D \times 100$

<Evaluation of Removability>

As a pretreatment, the measurement sample was held at 220° C. with GAP of 1 mm for 10 minutes and was then cooled to 80° C. (at a cooling rate of 14° C./min) for 10 minutes. Thereafter, the storage elastic modulus (G') was measured under the following measurement conditions using a rotary type rheometer ("HAAKE MARSIII" manufactured by Thermo Fisher Scientific Inc.).

Geometry: 25 mm$\phi$ parallel plate
GAP: 1 mm
Frequency: 1 Hz
Strain: 1%
Measurement range: 80° C. to 240° C. (heating rate of 3° C./min)

The removability was evaluated based on the following evaluation criteria from the storage elastic modulus (G') at 240° C.

A (Significantly favorable): The storage elastic modulus (G') is less than 400 Pa.
B (Favorable): The storage elastic modulus (G') is greater than or equal to 400 Pa and less than 600 Pa.
C (Poor): The storage elastic modulus (G') is greater than or equal to 600 Pa.

<Evaluation of Hot-Offset Resistance>

Polyester resin was melted and kneaded using a twin-screw extruder under the conditions of a set temperature of 120° C. and a staying time of 3 minutes.

The storage elastic modulus (G') was measured in the same manner as in the evaluation of the removability.

The hot-offset resistance was evaluated based on the following evaluation criteria from the storage elastic modulus (G') at 180° C.

A (Significantly favorable): The storage elastic modulus (G') is greater than or equal to 600 Pa.
B (Favorable): The storage elastic modulus (G') is greater than or equal to 300 Pa and less than 600 Pa.
C (Poor): The storage elastic modulus (G') is less than 300 Pa.

Example 1-1

Tetravalent carboxylic acid (a), polyvalent carboxylic acid (b), and polyhydric alcohol (c) which have a charge composition shown in Table 1, and tetra-n-butoxy titanium as a polymerization catalyst were placed in a polymerization device equipped with a distillation column. The amount of polymerization catalyst was set to 500 ppm with respect to the amount of tetravalent carboxylic acid (a) and polyvalent carboxylic acid (b).

Subsequently, the temperature raising was started and the mixture was heated so that the temperature in the reaction system became 265° C. The temperature was kept at this level, and an esterification reaction was carried out until no distillate of water is left from the reaction system. Subsequently, the temperature in the reaction system was set to 235° C., the inside of the polymerization device was decompressed, and a condensation reaction was carried out until the torque of a stirring blade reached a value showing a desired softening temperature while polyalcohol was distilled from the reaction system.

Thereafter, stirring of the polymerization device was stopped and the inside of the polymerization device was brought to atmospheric pressure. Thereafter, the inside of the polymerization device was pressurized with nitrogen, and a reactant was taken out from the lower portion of the polymerization device and cooled down to a temperature lower than or equal to 100° C. to obtain polyester resin for toner.

The composition of the constitutional units (resin composition) of the obtained polyester resin for toner was analyzed, and the glass transition temperature (Tg), the softening temperature (T4), the acid value, the gel content, and the number average molecular weight (Mn) were measured. The acid value of the polyester resin for toner after melting and kneading was measured. The result is shown in Table 2.

In addition, the obtained polyester resin for toner was coarsely pulverized using a pulverizer equipped with a 3 mm mesh at a discharge port, and further pulverized with a pulverizer TRIO BLENDER (manufactured by Trio Science Co., Ltd.) to obtain resin powder having an average particle diameter of 250 to 500 µm using a classifier (through sieving). The removability from the polymerization device was evaluated using the resin powder. The result is shown in Table 2.

In addition, 100 parts by mass of the obtained polyester resin for toner was melted and kneaded using a twin-screw extruder ("PCM-29" manufactured by Ikegai Corporation) under the conditions of a set temperature of 120° C. and a staying time of 3 minutes, and was then cooled. Thereafter, the resultant was pulverized, and resin powder having an average particle diameter of 250 to 500 µm was obtained using a classifier (through sieving). The hot-offset resistance was evaluated using the resin powder. The result is shown in Table 2.

Examples 1-2 to 1-9

Polyester resins for toner were produced in the same manner as in Example 1-1 except that the charge composition was changed as shown in Table 1, and various measurements and evaluations were carried out. The results are shown in Table 2.

Comparative Examples 1-1 to 1-6

Polyester resins for toner were produced in the same manner as in Example 1-1 except that the charge composition was changed as shown in Table 3, and various measurements and evaluations were carried out. The results are shown in Table 4.

TABLE 1

|  |  |  | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|---|
| Charge composition [parts by mol] | (a) | BPDA | 15 | 15 | 10 | 10 | 10 | — | — | — | — |
|  |  | a-BPDA | — | — | — | — | — | 10 | — | — | — |
|  |  | ODPA | — | — | — | — | — | — | 10 | — | — |
|  |  | BPAF | — | — | — | — | — | — | — | 10 | — |
|  |  | BPA-DA | — | — | — | — | — | — | — | — | 10 |
|  | (b) | TPA | 55 | 55 | 60 | 60 | 90 | 60 | 60 | 60 | 60 |
|  |  | IPA | 30 | 30 | 30 | 30 | 0 | 30 | 30 | 30 | 30 |
|  |  | PMDA | — | — | — | — | — | — | — | — | — |
|  |  | TMA | — | — | — | — | — | — | — | — | — |
|  | (c) | EG | 10 | 30 | 30 | 60 | 60 | 60 | 60 | 60 | 60 |
|  |  | BPP | 100 | 100 | 100 | 70 | 70 | 70 | 70 | 70 | 70 |
|  |  | BPE | 20 | — | — | — | — | — | — | — | — |
| Resin composition [parts by mol] | (a) | BPDA | 11 | 12 | 8 | 8 | 7 | — | — | — | — |
|  |  | a-BPDA | — | — | — | — | — | 8 | — | — | — |
|  |  | ODPA | — | — | — | — | — | — | 8 | — | — |
|  |  | BPAF | — | — | — | — | — | — | — | 8 | — |
|  |  | BPA-DA | — | — | — | — | — | — | — | — | 7 |
|  | (b) | TPA | 55 | 55 | 60 | 60 | 90 | 60 | 60 | 60 | 60 |
|  |  | IPA | 30 | 30 | 30 | 30 | 30 | — | 30 | 30 | 30 |
|  |  | PMDA | — | — | — | — | — | — | — | — | — |
|  |  | TMA | — | — | — | — | — | — | — | — | — |
|  | (c) | EG | 13 | 32 | 31 | 63 | 62 | 64 | 62 | 63 | 62 |
|  |  | BPP | 95 | 98 | 97 | 67 | 68 | 67 | 68 | 65 | 65 |
|  |  | BPE | 19 | — | — | — | — | — | — | — | — |

TABLE 2

|  |  | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|
| Characteristics of resin | Glass transition temperature (Tg) (° C.) | 65 | 66 | 65 | 60 | 63 | 63 | 59 | 64 | 62 |
|  | Softening temperature (T4) (° C.) | 178 | 157 | 146 | 142 | 146 | 172 | 141 | 149 | 163 |
|  | Acid value (mgKOH/g) | 15 | 16 | 9 | 9 | 8 | 9 | 9 | 9 | 9 |
|  | Gel content (mass %) | 42 | 39 | 23 | 39 | 29 | 42 | 32 | 32 | 38 |
|  | number average molecular weight (Mn) | 1660 | 1370 | 1430 | 1320 | 1320 | 1380 | 1360 | 1250 | 1340 |
| Offset resistance | Storage elastic modulus (Pa) at 180° C. | 681 | 1080 | 323 | 560 | 509 | 705 | 461 | 627 | 1214 |
|  | Evaluation | A | A | B | B | B | A | B | A | A |
| Removability | Storage elastic modulus (Pa) at 240° C. | 357 | 480 | 95 | 169 | 306 | 218 | 295 | 142 | 207 |
|  | Evaluation | A | B | A | A | A | A | A | A | A |

TABLE 3

|  |  |  | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|---|
| Charge composition [parts by mol] | (a) | BPDA | — | — | — | — | — | — |
|  |  | a-BPDA | — | — | — | — | — | — |
|  |  | ODPA | — | — | — | — | — | — |
|  |  | BPAF | — | — | — | — | — | — |
|  |  | BPA-DA | — | — | — | — | — | — |
|  | (b) | TPA | 58 | 55 | 52 | 50 | 75 | — |
|  |  | IPA | 30 | 30 | 30 | 30 | — | 95 |
|  |  | PMDA | 12 | 15 | 18 | — | — | — |
|  |  | TMA | — | — | — | 20 | 25 | 4 |
|  | (c) | EG | — | — | — | 30 | 45 | 35 |
|  |  | BPP | 100 | 100 | 100 | 100 | 85 | 25 |
|  |  | BPE | 30 | 30 | 30 | — | — | 20 |

TABLE 3-continued

|  |  | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|
| Resin composition [parts by mol] | (a) BPDA | — | — | — | — | — | 1 |
|  | a-BPDA | — | — | — | — | — | — |
|  | ODPA | — | — | — | — | — | — |
|  | BPAF | — | — | — | — | — | — |
|  | BPA-DA | — | — | — | — | — | — |
|  | (b) TPA | 58 | 55 | 52 | 50 | 75 | — |
|  | IPA | 30 | 30 | 30 | 30 | — | 94 |
|  | PMDA | 10 | 12 | 15 | — | — | — |
|  | TMA | — | — | — | 18 | 22 | 4 |
|  | (c) EG | — | — | — | 32 | 48 | 36 |
|  | BPP | 95 | 96 | 95 | 96 | 81 | 24 |
|  | BPE | 30 | 29 | 30 | — | — | 21 |

TABLE 4

|  |  | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|
| Characteristics of resin | Glass transition temperature (Tg) (° C.) | 58 | 60 | 58 | 62 | 60 | 60 |
|  | Softening temperature (T4) (° C.) | 111 | 141 | 142 | 105 | 152 | 114 |
|  | Acid value (mgKOH/g) | 14 | 16 | 17 | 15 | 9 | 56 |
|  | Gel content (mass %) | 0 | 25 | 32 | 0 | 26 | 0 |
|  | number average molecular weight (Mn) | 1340 | 1150 | 930 | 1180 | 1440 | 2400 |
| Offset resistance | Storage elastic modulus (Pa) at 180° C. | 52 | 110 | 184 | 81 | 259 | 48 |
|  | Evaluation | C | C | C | C | C | C |
| Removability | Storage elastic modulus (Pa) at 240° C. | 14 | 69 | 989 | 15 | 1195 | 10 |
|  | Evaluation | A | B | C | A | C | A |

The abbreviations in Tables 1 and 3 are as follows.
BPDA: 3,3',4,4'-Biphenyltetracarboxylic dianhydride
a-BPDA: 2,2',6,6'-Biphenyltetracarboxylic dianhydride
ODPA: 4,4'-Oxydiphthalic dianhydride
BPAF: 9,9-Bis(3,4-dicarboxyphenyl) fluorene dianhydride
BPA-DA: 4,4'-(4,4'-Isopropylidenediphenoxy) diphthalic anhydride
TPA: Terephthalic acid
IPA: Isophthalic acid
PMDA: Pyromellitic dianhydride
TMA: Trimellitic anhydride
EG: Ethylene glycol
BPP: 2.3 Mol of bisphenol A-propylene oxide adduct
BPE: 2.0 Mol of bisphenol A-ethylene oxide adduct The polyester resin for toner obtained in each example had excellent removability from a polymerization device and hot-offset resistance.

On the other hand, in Comparative Examples 1-1 and 1-2, pyromellitic dianhydride was used, but the degree of polymerization did not increase sufficiently. Therefore, the hot-offset resistance was insufficient.

In Comparative Example 1-3, the degree of polymerization increased because a larger amount of pyromellitic dianhydride than that of Comparative Examples 1-1 and 1-2 was used. However, the hot-offset resistance was insufficient compared to that of each of the examples. In addition, since the degree of polymerization increased, the removability from a polymerization device was also insufficient.

On the other hand, in Comparative Example 1-4, trimellitic anhydride was used, but the degree of polymerization did not increase sufficiently. Therefore, the hot-offset resistance was insufficient.

In Comparative Example 1-5, the degree of polymerization increased because a larger amount of trimellitic anhydride than that of Comparative Example 1-4 was used. However, the offset resistance was insufficient compared to that of each of the examples. In addition, since the degree of polymerization increased, the removability from a polymerization device was also insufficient.

In Comparative Example 1-6, the acid value after melting and kneading was 56 mgKOH/g. Therefore, the hot-offset resistance was insufficient.

<Measurement of TVOC>

The TVOC of polyester resin was measured as follows.

Approximately 10 mg (greater than or equal to 9.9 mg and less than 10.1 mg) of a measurement sample was precisely weighed, and volatile components were extracted from the measurement sample by heating the volatile components at 130° C. for 10 minutes in a thermal desorption device, and were then trapped (concentrated) using a cooling module. Subsequently, the resultant was heated rapidly. Then, the resultant was placed in GC-MS and the TVOC was quantitatively determined. The measurement device, the measurement conditions, and the quantitative determination method are as follows.

(Measurement Device)
Thermal desorption device: "THERMAL DESORPTION INTRODUCTION SYSTEM TDS A/TDS 2/CIS 4" manufactured by GERSTEL K. K.
GC-MS: "GC/MS 6890N/5975" manufactured by Agilent Technologies (Thermal Desorption Conditions)
Sample-heating temperature: 50° C. (0.5 min)→50° C./min→130° C. (10 min)

Cryo-focus and rapid heating condition: −30° C. (0.5 min)→12° C./sec→130° C. (10 min)
Interface: 130° C.
Carrier gas: Helium
Desorption Mode: Splitless
(GC Conditions)
Column: "UA-5 (30 min×0.25 mm I.D., film thickness of 0.25 μm)" manufactured by Frontier Laboratory Co., Ltd.
Sample-heating temperature: 35° C. (3 min)→10° C./min→330° C. (7 min)
Carrier gas: Helium (flow rate of 1.0 ml/min)
Injection port mode: Solvent vent (vent flow rate of 50 ml/min, split vent line flow rate of 30 min/min @0.02 min)
Transfer line temperature: 280° C.
(MS Conditions)
Ionization method: EI
Ionization voltage: 70 V
Ionization current: 300 μA
Scan range: 29 to 550 amu
(Quantitative Determination Method of TVOC)

Regarding components detected during a peak elution time of n-hexane and n-hexadecane in an obtained chromatogram, a sum of peak areas of the components excluding ethylene glycol (EG) was calculated as a toluene-converted concentration from measurement results (peak areas) of a previously prepared toluene solution (at 1,000 ppm, an injection amount of 1 μl under the above-described GC and MS conditions).

Regarding EG, the peak area of EG was calculated as an EG concentration from the measurement result (peak area) of a previously prepared EG solution (1,000 ppm, injection amount of 1 μl under the above-described GC and MS conditions).

A value of a sum of the concentration of EG and the concentration of the sum of the areas of the components excluding EG was set as TVOC.

Example 2-1

Tetravalent carboxylic acid (a), polyvalent carboxylic acid (b), and polyhydric alcohol (c) which have a charge composition shown in Table 5, and tetra-n-butoxy titanium as a polymerization catalyst were placed in a polymerization device equipped with a distillation column. The amount of polymerization catalyst was set to 1,000 ppm with respect to the amount of tetravalent carboxylic acid (a) and polyvalent carboxylic acid (b).

Subsequently, the temperature raising was started and the mixture was heated so that the temperature in the reaction system became 265° C. The temperature was kept at this level, and an esterification reaction was carried out until no distillate of water is left from the reaction system. Subsequently, the temperature in the reaction system was set to 235° C., the inside of the polymerization device was decompressed, and a condensation reaction was carried out until the torque of a stirring blade reached a value showing a desired softening temperature while polyalcohol was distilled from the reaction system.

Thereafter, stirring of the polymerization device was stopped and the inside of the polymerization device was brought to atmospheric pressure. Thereafter, the inside of the polymerization device was pressurized with nitrogen, and a reactant was taken out from the lower portion of the polymerization device and cooled down to a temperature lower than or equal to 100° C. to obtain polyester resin for toner.

The TVOC, the glass transition temperature (Tg), the softening temperature (T4), and the gel content of the obtained polyester resin for toner were measured. The acid value of the polyester resin for toner after melting and kneading was measured. The results are shown in Table 5.

Examples 2-2 to 2-4

Polyester resins for toner were produced in the same manner as in Example 2-1 except that the charge composition was changed as shown in Table 5, and various measurements and evaluations were carried out. The results are shown in Table 5.

Comparative Example 2-1

Polyester resin for toner was produced in the same manner as in Example 2-1 except that the charge composition was changed as shown in Table 5, and various measurements and evaluations were carried out. The results are shown in Table 5.

TABLE 5

| | | Example 2-1 | Example 2-2 | Example 2-3 | Example 2-4 | Comparative Example 2-1 |
|---|---|---|---|---|---|---|
| Charge composition [parts by mol] | TPA | 60 | 77 | 73.5 | 79 | 81 |
| | IPA | 30 | — | — | — | 1 |
| | EG | 60 | 45 | 45 | 45 | 55 |
| | BPP | 70 | 85 | 85 | 85 | 60 |
| | BPE | — | — | — | — | 10 |
| | BPDA | 10 | 3 | 1.5 | 6 | — |
| | TMA | — | 20 | 25 | 15 | 18 |
| Catalyst (ppm) | TBT | 1000 | 1000 | 1000 | 1000 | — |
| | Sb2O3 | — | — | — | — | 900 |
| Characteristics of resin | Glass transition temperature (Tg) (° C.) | 60 | 65 | 65 | 64 | 64 |
| | Softening temperature (T4) (° C.) | 141 | 140 | 152 | 143 | 162 |
| | Acid value (mgKOH/g) | 9 | 14 | 16 | 13 | 8 |
| | Gel content (mass %) | 31 | 30 | 45 | 17 | 22 |
| VOC | TVOC (ppm) | 79 | 4 | 2 | 20 | 548 |
| | EG amount (ppm) | 73 | 0 | 0 | 12 | 496 |

The abbreviations in Table 5 are as follows.
BPDA: 3,3',4,4'-Biphenyltetracarboxylic dianhydride
TPA: Terephthalic acid
IPA: Isophthalic acid
TMA: Trimellitic anhydride
EG: Ethylene glycol
BPP: 2.3 Mol of bisphenol A-propylene oxide adduct
BPE: 2.3 Mol of bisphenol A-ethylene oxide adduct
TBT: Tetra-n-butoxy titanium
$Sb_2O_3$: Antimony Since the polyester resins for toner obtained in each example contained tetravalent carboxylic acid (a), the TVOC was low.

On the other hand, in Comparative Example 2-1, the TVOC was high because there was no tetravalent carboxylic acid (a).

INDUSTRIAL APPLICABILITY

According to the present invention, it is possible to provide polyester resin for toner which has excellent hot-offset resistance and can be easily taken out from a polymerization device, a method for producing the same, toner, and a method for producing the same.

According to the present invention it is possible to provide polyester resin for toner which has sufficiently reduced TVOC, and toner containing the polyester resin for toner.

The invention claimed is:

1. A polyester resin, comprising:
(a) a constitutional unit derived from at least one tetravalent carboxylic acid selected from the group consisting of 3,3',4,4'-biphenyltetracarboxylic dianhydride, 2,2',6,6'-biphenyltetracarboxylic dianhydride, 4,4'-oxydiphthalic dianhydride, 9,9-bis(3,4-dicarboxyphenyl) fluorene dianhydride, and 4,4'-(4,4'-isopropylidenediphenoxy) diphthalic anhydride;
a constitutional unit derived from a bisphenol A-alkylene oxide adduct; and
a constitutional unit derived from an aliphatic alcohol having a boiling point of lower than or equal to 290° C.,
wherein the polyester resin is free of a constitutional unit derived from a monovalent carboxylic acid,
wherein an acid value of the polyester resin is 8 to 55 mg KOH/g,
an amount of the tetravalent carboxylic acid is 1 to 30 mol % when a total amount of the tetravalent carboxylic acid, and divalent carboxylic acid is set to 100 mol %, and
a gel content of the polyester resin is 10 to 50 mass % with respect to a total mass of the polyester resin.

2. The polyester resin according to claim 1, wherein a total volatile organic compound of the polyester resin is less than or equal to 380 ppm.

3. The polyester resin according to claim 1,
wherein a storage elastic modulus G' of the polyester resin at 180° C. after melting and kneading is greater than or equal to 300 Pa.

4. The polyester resin according to a claim 1,
wherein a storage elastic modulus G' of the polyester resin at 240° C. is less than or equal to 1,000 Pa.

5. A method for producing the polyester resin according to claim 1, the method comprising:
reacting dicarboxylic acid, an aliphatic alcohol having a boiling point of lower than or equal to 290° C., and bisphenol A-alkylene oxide adduct in the presence of at least one tetravalent carboxylic acid selected from the group consisting of 3,3',4,4'-biphenyltetracarboxylic dianhydride, 2,2',6,6'-biphenyltetracarboxylic dianhydride, 4,4'-oxydiphthalic dianhydride, 9,9-bis(3,4-dicarboxyphenyl) fluorene dianhydride, and 4,4'-(4,4'-isopropylidenediphenoxy) diphthalic anhydride (a).

6. A toner, comprising:
the polyester resin according to claim 1.

7. A method for producing a toner, the method comprising:
kneading the polyester resin according to claim 1.

8. The polyester resin according to claim 1, wherein the acid value of the polyester resin is 15 to 55 mg KOH/g.

* * * * *